United States Patent
Chuang

(10) Patent No.: US 9,363,362 B2
(45) Date of Patent: Jun. 7, 2016

(54) METHOD OF PERFORMING NETWORK PERSONALIZATION ON MOBILE DEVICES

(71) Applicant: ACER INCORPORATED, New Taipei (TW)

(72) Inventor: Chia-Yun Chuang, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

(21) Appl. No.: 14/489,494

(22) Filed: Sep. 18, 2014

(65) Prior Publication Data

US 2015/0099485 A1 Apr. 9, 2015

Related U.S. Application Data

(60) Provisional application No. 61/888,521, filed on Oct. 9, 2013.

(30) Foreign Application Priority Data

Apr. 9, 2014 (TW) .............................. 103113084 A

(51) Int. Cl.
H04M 1/72 (2006.01)
H04M 1/725 (2006.01)
H04W 8/18 (2009.01)

(52) U.S. Cl.
CPC .......... *H04M 1/72577* (2013.01); *H04W 8/183* (2013.01)

(58) Field of Classification Search
CPC ..... H04W 8/183; H04W 24/02; H04W 48/16; H04W 48/18; H04W 4/001; H04W 4/003; H04W 4/24; H04W 74/00; H04W 74/006; H04M 1/72577; H04M 11/00; H04M 15/00; H04M 15/49; H04M 15/80; H04M 15/8022
See application file for complete search history.

(56) References Cited

U.S. PATENT DOCUMENTS

| | | | |
|---|---|---|---|
| 2011/0195700 A1 | 8/2011 | Kukuchka | |
| 2011/0238532 A1 | 9/2011 | Zargahi | |
| 2012/0129513 A1* | 5/2012 | van der Laak | H04W 4/001 455/419 |
| 2012/0302224 A1* | 11/2012 | Schreiner | H04W 8/205 455/418 |
| 2013/0102306 A1* | 4/2013 | Sachanandani | H04L 63/0853 455/432.2 |

(Continued)

FOREIGN PATENT DOCUMENTS

WO 2009049679 A1 4/2009

OTHER PUBLICATIONS

3rd Generation Partnership Project; Technical Specification Group Services and System Aspects; Personalisation of Mobile Equipment (ME); Mobile functionality specification (Release 4), 3GPP TS 22.022 V4.0.0 (Mar. 2001), pp. 1-22, XP050360425.

*Primary Examiner* — Hirdepal Singh
(74) *Attorney, Agent, or Firm* — Winston Hsu; Scott Margo

(57) ABSTRACT

A mobile device is network-personalized according to an MCC, an MNC and an SPN of a smartcard issued by a specific service provider. During the booting process, the mobile device may directly access an IMSI elementary file and an SPN elementary file of a currently inserted smartcard and thus determine whether the currently inserted smartcard is issued by the specific service provider. Therefore, even if the smartcards issued by two different service providers have the same MCC and MNC in its IMSI elementary file due to cooperation, the present method of performing network personalization is able to determine whether these smartcards can be used to provide full function on the mobile device.

5 Claims, 3 Drawing Sheets

(56) References Cited

U.S. PATENT DOCUMENTS

| | | | |
|---|---|---|---|
| 2014/0004831 A1* | 1/2014 | Yao | H04W 8/18 455/411 |
| 2014/0057679 A1* | 2/2014 | Berionne | H04W 8/205 455/558 |
| 2014/0213233 A1* | 7/2014 | Parry | H04W 24/02 455/418 |
| 2015/0006727 A1* | 1/2015 | Park | H04L 63/107 709/225 |
| 2015/0094050 A1* | 4/2015 | Bowles | H04W 8/02 455/418 |

* cited by examiner

EF_IMSI

| Identifier: '6F07' | Structure: transparent | Mandatory |
|---|---|---|
| SFI: '07' | | |
| File size: 9 bytes | Update activity: low | |
| Access Conditions:<br>READ        PIN<br>UPDATE    ADM<br>INVALIDATE ADM<br>REHABILITATE PIN | | |

| Bytes | Description | M/O | Length |
|---|---|---|---|
| 1 | Length of IMSI | M | 1 byte |
| 2 to 9 | IMSI | M | 8 bytes |

EF$_{SPN}$

| Identifier: '6F46' | Structure: transparent | Optional |
|---|---|---|
| File size: 17 bytes | Update activity: low | |
| Access Conditions:<br>READ ALWAYS<br>UPDATE ADM<br>INVALIDATE ADM<br>REHABILITATE ADM | | |

| Bytes | Description | M/O | Length |
|---|---|---|---|
| 1 | Display Condition | M | 1 byte |
| 2 to 17 | Service Provider Name | M | 16 bytes |

FIG. 3

METHOD OF PERFORMING NETWORK PERSONALIZATION ON MOBILE DEVICES

CROSS REFERENCE TO RELATED APPLICATIONS

This application claims the benefit of U.S. provisional application No. 61/888,521 filed on Oct. 9, 2013.

BACKGROUND OF THE INVENTION

1. Field of the Invention

The present invention is related to a method of performing network personalization on a mobile device, and more particularly, to a method of performing network personalization on a mobile device in order to distinguish smartcards issued by different service providers.

2. Description of the Prior Art

Subscriber identity module (SIM) card is a smartcard that securely stores the international mobile subscriber identity (IMSI) used to identify and authenticate subscribers, short message service (SMS) data and contact information on mobile telephony devices. The hardware structure of a SIM card includes a central process unit (CPU), read-only memory (ROM), random access memory (RAM), electrically erasable programmable read-only memory (EEPROM), and an input/output (I/O) circuit. The hierarchical logic data structure of a SIM card includes 3 types of files: elementary file (EF), dedicated file (DF) and master file (MF).

According to the 3rd Generation Partnership Project (3GPP) specification TS 22.022, there are five features to personalize user equipment (UE): network personalization, network subset personalization, service provider (SP) personalization, corporate personalization, and SIM/USIM personalization. During the booting process, the UE obtains the IMSI from its SIM card, and passes this to the mobile operator requesting access and authentication. If the SIM card is locked, the user may have to pass a valid personal identification number (PIN) before the SIM card reveals this information.

In the prior art method of performing network personalization on a mobile device, the mobile country code (MCC) and the mobile network code (MNC) of a specific network are used as feature data. During the booting process, the mobile device is configured to read the contents of the international mobile subscriber identity elementary file ($EF_{IMSI}$) from the currently inserted SIM/USIM card. If the corresponding MCC and MNC indicated in the international mobile subscriber identity elementary file $EF_{IMSI}$ matches the previously stored feature data, the mobile device may operate in a normal mode; if there is no match, the mobile can only operate in a restricted mode. In other words, a specific mobile device which has been network personalized can only operate in the normal mode when inserted with the SIM card issued by a specific service provider.

FIG. 1 is a diagram illustrating the international mobile subscriber identity elementary file $EF_{IMSI}$ of SIM/USIM cards defined in the 3GPP specification TS 51.011. as depicted in field 10, bytes 2~9 are used to stored IMSI data. According to the 3GPP specification TS 23.003, IMSI data includes a 3-digit MCC for identifying uniquely the country of domicile of the service provider and a 2-digit or 3-digit MNC for identifying the home (public land mobile network, PLMN) of the service provider.

If a service provider A and a service provider B are cooperative operators, the SIM cards issued by both service providers contain the international mobile subscriber identity elementary file $EF_{IMSI}$ which indicate identical MCC and MNC. Therefore, the prior art method of performing network personalization is unable to distinguish the SIM card issued by the service provider A and the SIM card issued by the service provider B.

SUMMARY OF THE INVENTION

The present invention provides a method of performing network personalization on a mobile device. The method includes acquiring an MCC and an MNC indicated in an international mobile subscriber identity elementary file of a specific smartcard; acquiring an SPN indicated in a service provider name elementary file of the specific smartcard; storing the MCC, the MNC and the SPN acquired from the specific smartcard in the mobile device as feature data; accessing an international mobile subscriber identity elementary file and a service provider name elementary file of a currently inserted smartcard of the mobile device during a booting process; and the mobile device entering a normal mode when determining that the accessed international mobile subscriber identity elementary file and the accessed service provider name elementary file of the currently inserted smartcard matches the feature data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating the international mobile subscriber identity elementary file $EF_{IMSI}$ of SIM/USIM cards.

FIG. 3 is a diagram illustrating the service provider name elementary file $EF_{SPN}$ of SIM/USIM cards.

DETAILED DESCRIPTION

Figure 2:
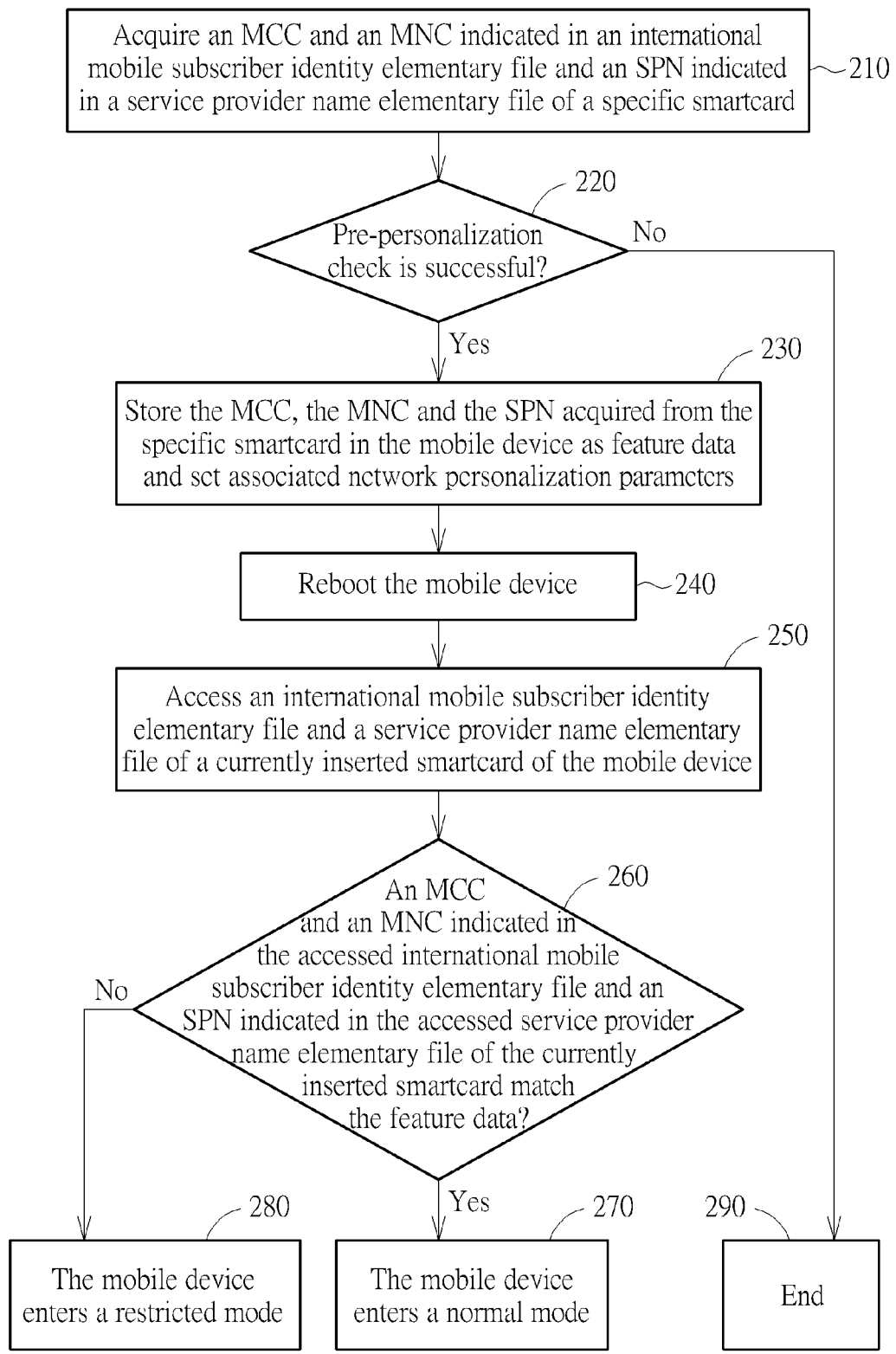
FIG. 2 is a flowchart illustrating a method of performing network personalizing on a mobile device according to the present invention.

The present invention provides a method of performing network personalization on mobile devices in order to distinguish the smartcards issued by different service providers. The present network personalization method may be applied to electronic devices including, but not limited to, mobile telephones, personal digital assistants, handheld computers, tablet computers, nettop computers, or laptop computers, or other devices with similar telecommunication capabilities. However, the type of mobile device does not limit the scope of the present invention.

The present network personalization method may be applied to mobile devices inserted with various types of smartcards including, but not limited to, a SIM card for global system for mobile communications (GSM) system, a USIM card for universal mobile telecommunications system (UMTS), or a removable user identity module (R-UIM) card/ code division multiple access (CDMA) user identity module (CSIM) card for CDMA systems. However, the type of the smartcard does not limit the scope of the present invention.

The present network personalization method may be applied to a mobile device inserted with a smartcard of various sizes including, but not limited to, a standard Mini SIM card, a Micro SIM card or a Nano SIM card. However, the size of the smartcard does not limit the scope of the present invention.

FIG. 2 is a flowchart illustrating a method of performing network personalizing on a mobile device according to the present invention. The flowchart in FIG. 2 includes the following steps:

Step 210: acquire an MCC and an MNC indicated in an international mobile subscriber identity elementary file $EF_{IMSI}$ and a service provider name (SPN) indicated in a service provider name elementary file ($EF_{SPN}$) of a specific smartcard; execute step 220.

Step 220: determine whether a pre-personalization check is successful: if yes, execute step 230; if no, execute step 290.

Step 230: store the MCC, the MNC and the SPN acquired from the specific smartcard in the mobile device as feature data and set associated network personalization parameters; execute step 240.

Step 240: reboot the mobile device; execute step 250.

Step 250: access an international mobile subscriber identity elementary file and a service provider name elementary file of a currently inserted smartcard of the mobile device; execute step 260.

Step 260: determine whether an MCC and an MNC indicated in the accessed international mobile subscriber identity elementary file and an SPN indicated in the accessed service provider name elementary file of the currently inserted smartcard match the feature data: if yes, execute step 270; if no, execute step 280.

Step 270: the mobile device enters a normal mode.

Step 280: the mobile device enters a restricted mode.

Step 290: end.

FIG. 3 is a diagram illustrating the service provider name elementary file $EF_{SPN}$ of SIM/USIM cards defined in the 3GPP specification 51.011. Field 20 depicts the access condition of reading, updating, invalidating and rehabilatating the service provider name elementary file $EF_{SPN}$. "ALW" means that the service provider name elementary file $EF_{SPN}$ can be read anytime. As depicted in field 30, bytes 2~17 are used to describe the SPN. In step 210, the present invention can acquire the MCC, the MNC and the SPN of a specific smartcard by reading the contents of the international mobile subscriber identity elementary file $EF_{IMSI}$ and the service provider name elementary file $EF_{SPN}$ of the specific smartcard In step 220, it is determined whether the pre-personalization check is successful. According to the 3GPP specification 22.022, during the personalization cycle of a category before any changes are made to the existing personalization data, the following two conditions shall be checked:

Condition 1: the category to be personalized is not currently activated;

Condition 2: the new codes to be stored are a subset of the existing codes

For example, in order to modify the entities of an active network personalization category, Condition 1 is satisfied only after de-personalizing the network personalization category. If the existing codes includes feature data SU1 stored in the previously executed SIM/USIM personalization and feature data N1 associated with the network personalization category is acquired in step 210, Condition 2 is satisfied only by updating the existing codes with (SU1-N1) and is not satisfied by updating the existing codes with (SU2-N1). If any of Condition 1 or Condition 2 is not satisfied, step 290 is executed for ending the network personalization.

In step 230, the MCC, the MNC and the SPN acquired in step 210 are stored in the mobile device as feature data and associated network personalization parameters may be set when the pre-personalization check is successful. According to the 3GPP specification 22.022, setting network personalization parameters includes storing a network control key (NCK) and setting the status of a network personalization indicator. The NCK is a decimal string of 8~16 digits and randomly selected for each mobile device by the service provider. Correct NCK must be entered in order to de-personalizing the mobile device in network personalization category. When the network personalization indicator is set to "ON", it indicates that the network personalization has been activated; when the network personalization indicator is set to "OFF", it indicates that the network personalization has been deactivated. In step 230, the network personalization indicator is set to "ON". Under such circumstances, the mobile device is required to perform verifications during the booting process, which will be described in the subsequent paragraphs.

After rebooting the mobile device in step 240, the mobile device is configured to access the international mobile subscriber identity elementary file $EF_{IMSI}$ and the service provider name elementary file $EF_{SPN}$ of the currently inserted smartcard of the mobile device in step 250. In step 260, it is determined whether the MCC and the MNC indicated in the accessed international mobile subscriber identity elementary file $EF_{IMSI}$ and the SPN indicated in the accessed service provider name elementary file $EF_{SPN}$ match the feature data stored in step 230. If there is a match, it can be determined that the currently inserted smartcard and the smartcard used to perform network personalization are issued by the same service provider, and the mobile device is configured to enter the normal mode in step 270. If there is no match, it can be determined that the currently inserted smartcard and the smartcard used to perform network personalization are not issued by the same service provider, and the mobile device is configured to enter the restricted mode in step 280. In the present invention, the restricted mode may be an emergency calls only mode defined in the 3GPP specification TS 22.022 in which the mobile device shall use the temporary mobile subscriber identity (TMSI) assigned by the visitor location register (VLR) for making any emergency call request.

The present network personalization method uses the MCC and the MNC indicated in the international mobile subscriber identity elementary file $EF_{IMSI}$ and the SPN indicated in the service provider name elementary file $EF_{SPN}$ of a specific smartcard as feature data. If a service provider A and a service provider B are cooperative operators, the SIM cards issued by both service providers contain the international mobile subscriber identity elementary file $EF_{IMSI}$ which indicate identical MCC and MNC. Under such circumstance, the present method of performing network personalization may distinguish the SIM card issued by the service provider A and the SIM card issued by the service provider B based on the SPN indicated in the service provider name elementary file $EF_{SPN}$. Therefore, even if the smartcards issued by two different service providers have the same MCC and MNC in its international mobile subscriber identity elementary file $EF_{IMSI}$ due to cooperation, the present method of performing network personalization is able to determine whether these smartcards can be used to provide full function on the mobile device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing network personalization on a mobile device, comprising:

acquiring a mobile country code (MCC) and a mobile network code (MNC) indicated in an international mobile subscriber identity elementary file ($EF_{IMSI}$) of a specific smartcard;

acquiring a service provider name (SPN) indicated in a service provider name elementary file ($EF_{SPN}$) of the specific smartcard;

determining whether a pre-personalization check is successful by:

verifying that the mobile device has not been network personalized before performing the booting process; and verifying that the MCC, the MNC and the SPN acquired from the specific smartcard is a subset of an existing personalization code of the specific smartcard;

storing the MCC, the MNC and the SPN acquired from the specific smartcard in the mobile device as feature data after determining that the pre-personalization check is successful;

accessing an international mobile subscriber identity elementary file and a service provider name elementary file of a currently inserted smartcard of the mobile device during a booting process; and the mobile device entering a normal mode when determining that the accessed international mobile subscriber identity elementary file and the accessed service provider name elementary file of the currently inserted smartcard matches the feature data.

2. The method of claim 1, further comprising:

the mobile device entering a restricted mode when determining that the accessed international mobile subscriber identity elementary file and the accessed service provider name elementary file of the currently inserted smartcard does not match the feature data.

3. The method of claim 2, wherein the mobile device is configured to perform more functions in the normal mode than in the restricted mode.

4. The method of claim 1, further comprising:

storing a network control key (NCK) in the mobile device.

5. The method of claim 1, further comprising:

setting a network personalization indicator to an active state.

* * * * *